(12) United States Patent
Fini (10) Patent No.: US 7,865,051 B2
(45) Date of Patent: Jan. 4, 2011

(54) POLARIZATION-DEPENDENT HOLLOW-CORE OPTICAL FIBERS

(75) Inventor: John Michael Fini, Jersey City, NJ (US)

(73) Assignee: OFS Fitel, LLC, Norcross, GA (US)

( * ) Notice: Subject to any disclaimer, the term of this patent is extended or adjusted under 35 U.S.C. 154(b) by 50 days.

(21) Appl. No.: 12/217,215

(22) Filed: Jul. 2, 2008

(65) Prior Publication Data

US 2010/0002980 A1 Jan. 7, 2010

(51) Int. Cl.
G02B 6/032 (2006.01)
G02B 6/036 (2006.01)
(52) U.S. Cl. ......................... 385/125; 385/126
(58) Field of Classification Search .................. 385/125, 385/126
See application file for complete search history.

(56) References Cited

U.S. PATENT DOCUMENTS

2007/0274652 A1* 11/2007 Dangui et al. ............... 385/126

\* cited by examiner

*Primary Examiner*—Uyen-Chau N Le
*Assistant Examiner*—Kajli Prince
(74) *Attorney, Agent, or Firm*—Michael J. Urbano; Michael A. Morra; Ann M. LaFeir (57) ABSTRACT

In accordance with one aspect of the invention, the core and cladding regions of a hollow-core optical fiber are configured so that a signal mode is coupled to a cladding mode in order to exploit polarization-dependent properties. In general, the fiber comprises a hollow-core region surrounded by a cladding region, which includes a localized hollow-waveguide region. The core and waveguide regions are configured so that the coupling between a signal mode in the core region and a cladding mode in the waveguide region are phase-matched for efficient coupling, and the phase-matching condition is made polarization-dependent to provide improved control of the fiber's polarization dependent properties.

6 Claims, 7 Drawing Sheets

POLARIZATION-DEPENDENT HOLLOW-CORE OPTICAL FIBERS

BACKGROUND OF THE INVENTION

1. Field of the Invention

This invention relates to the polarization-dependent, hollow-core, optical fibers and, more particularly, to the control of transverse optical modes by their polarization state in such fibers.

2. Discussion of the Related Art

A transverse optical mode propagating in the core of an optical fiber is typically composed of two orthogonal polarization states. If the mode is birefringent, the orthogonal polarization states propagate with different effective index values (or propagation constants). On the other hand, if the mode is not birefringent, the two polarization states propagate with the same effective index value (propagation constant).

Control of these polarization states (or simply polarization) is important, for example, in the design of optical amplifiers. In addition, polarization dependence may be exploited in a variety of other optical devices such as polarization splitters, couplers, filters and the like. Thus, for example, polarization plays a significant role in the use of bandgap fibers, and in particular hollow-core fibers. Hollow-core fibers may be advantageous for communications applications since they have nonlinearities much lower than traditional solid-core fibers. However, hollow-core fibers typically have large accidental birefringence, which leads to differential delay between orthogonal polarizations. This delay may be unacceptable in some communications systems. Since accidental birefringence may not be eliminated easily, a system with intentional management of polarization may be preferred and may include polarization-maintaining fibers, polarizing fibers, and polarization-sensitive couplers or splitters. Hollow-core fibers may also be used in sensors, as dispersion elements in a pulse amplification system, etc. It is often desirable to control polarization in these applications as well. Polarization-maintaining, hollow-core fibers have already been incorporated in some experimental demonstrations, and polarizing or polarization-splitting fibers would also be useful.

Prior art designs exist for polarization-maintaining (birefringent) bandgap fibers and fibers with limited polarization dependent loss. These approaches have severe limitations in performance and functionality. For example, high birefringence or polarization-dependent loss are often accompanied by undesirable properties such as high signal loss, high surface interaction, limited bandwidth, non-circular mode shape, etc.

Thus, there is a need in the art for hollow-core optical fibers with polarization-controlling properties that alleviate or overcome one or more of the limitations of the aforementioned prior art. In particular, there is a need for optical fibers that are capable of controlling polarization-dependent loss and/or polarization-dependent coupling.

BRIEF SUMMARY OF THE INVENTION

In accordance with one aspect of my invention, the core and cladding regions of a hollow-core optical fiber are configured so that a signal (core) transverse mode is coupled to a cladding (waveguide) transverse mode in order to exploit polarization-dependent properties. In general, the fiber comprises a hollow-core region surrounded by a cladding region, which includes a localized, hollow waveguide region. The core and waveguide regions are configured so that the coupling between a signal mode in the core region and a waveguide mode in the waveguide region are phase-matched for efficient coupling, and the phase-matching condition is made polarization-dependent to provide improved control of the fiber's polarization dependent properties. In a preferred embodiment, the cladding region comprises a bandgap structure.

The physical design of the fiber determines the effective indices of the modes, which can be configured to achieve (i) phase-matching between a given set of core and waveguide modes of one polarization, and (ii) a phase-mismatch between the analogous core and waveguide modes of an orthogonal polarization. Alternatively, the effective indices can be configured to achieve (i) phase-matched, resonant coupling at a first coupling level between core and waveguide modes of one polarization and (ii) phase-matched, resonant coupling at a second, different coupling level between core and waveguide modes of an orthogonal polarization.

To this end, at least one of the core and waveguide regions is configured to be birefringent; that is, the two polarization states of the optical mode of the one region have different effective indices. One of these polarizations is index-matched to a mode of the other region, thereby resonantly coupling the one polarization from the core region to the waveguide region, or conversely. In an alternative embodiment, both the core and waveguide regions are configured to be birefringent, and one of the waveguide mode polarizations is index-matched (resonantly coupled) to a corresponding polarization of the signal mode.

In one embodiment, the at least one region has a non-symmetric cross-sectional shape (e.g., oblong) with respect to one of its transverse axes. In an alternative embodiment, both the core region and the waveguide region are non-symmetric but with respect to orthogonal axes.

In another embodiment, the at least one region has a multiplicity of micro-defects disposed at or near the periphery thereof and in a non-rotationally-symmetric pattern. In an alternative embodiment, both the core region and the waveguide region include a multiplicity of micro-defects disposed at or near their peripheries and in non-rotationally-symmetric patterns.

Optical fibers of this type find application in polarization-dependent optical couplers (e.g., splitters, polarizers) and optical sensors.

BRIEF DESCRIPTION OF THE SEVERAL VIEWS OF THE DRAWING

My invention, together with its various features and advantages, can be readily understood from the following more detailed description taken in conjunction with the accompanying drawing, in which:

FIGS. 3-5 are schematic, effective index profiles of the core and waveguide regions used to describe resonant polarization-dependent coupling (or lack thereof) between core and waveguide modes of a straight fiber, in accordance with one embodiment of my invention. In FIG. 3, both the core region and the waveguide region are depicted as being birefringent, in FIG. 4 only the core region is birefringent, and in FIG. 5 only the waveguide region is birefringent;

FIG. 17A is a block diagram of polarization-dependent apparatus in accordance with illustrative applications of my invention, wherein FIGS. 17B, C and D show the various polarization states of the core and waveguide regions at the input/output of a fiber designed in accordance with various embodiments of my invention.

Various ones of the foregoing figures are shown schematically in that they are not drawn to scale and/or, in the interests of simplicity and clarity of illustration, do not include all of the details of an actual optical fiber or product depicted. In particular, the index profiles of FIGS. 3-5, 7-8 and 15 are averages of the actual variations of index that would be observable in an optical fiber.

Although the use of the term radius in the foregoing (and following) discussion implies that the cross-sections of the various regions (e.g., core, waveguide, cladding) are circular and/or annular, in practice these regions may be non-circular; for example, they may be elliptical, polygonal, irregular or other more complex shapes. Nevertheless, as is common in the art, I at times use the term radius for simplicity and clarity.

Hereinafter, the term mode(s) shall mean transverse mode(s).

In addition, the term hollow means that a region (core, waveguide, or both) is not filled with a solid. However, it may be filled with a fluid [e.g., a gas (typically, but not necessarily, air) or a liquid (typically in sensor applications)]. The fluid may render the region (core, For different types of waveguides, there are a variety of notations for specifying the transverse modes and polarization states (for example, $LP_{nm}$, $HE_{n',m'}$, $TE_{n'',m'''}$, etc). In the description that follows, we often label these orthogonal states for simplicity by $E_x$ if the electric field is primarily x-directed and $E_y$ is primarily y-directed, where (x,y) are a set of standard Cartesian coordinates, which may be aligned with a symmetry axis of the fiber, if any symmetry axis exists. For example, the relevant signal mode may be a fundamental-like mode of a guiding region, and decomposition into linear polarizations is natural. More generally, the electric fields of a polarization state are not necessarily linear, nor aligned with any pre-defined axes. Other modes would have different representations, which are well known in the art, and the polarization states can more generally be referred to as the first and second orthogonal polarization states of a mode. Often, the two polarization states of a transverse mode of some guiding structure have nearly (but not strictly) the same intensity profile.

DETAILED DESCRIPTION OF THE INVENTION

Optical Fiber Design

Polarization Dependent Considerations

Figure 1:
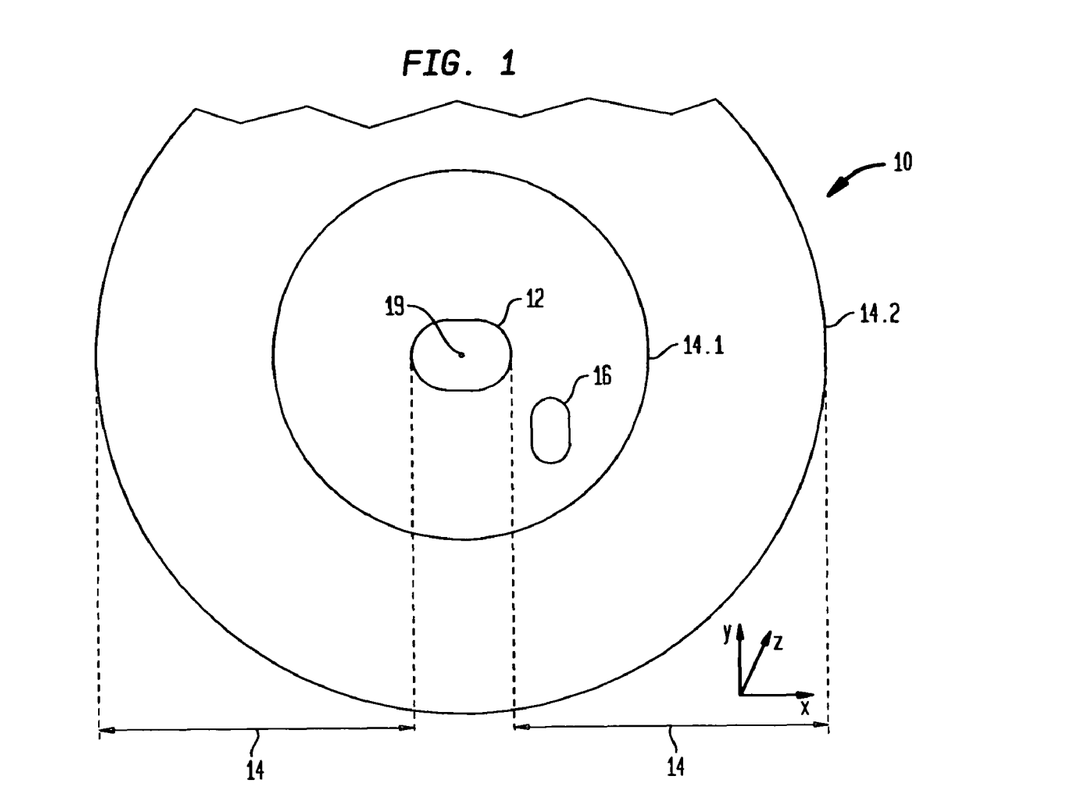
FIG. 1 is a schematic, cross-sectional view of an optical fiber in which the core and waveguide regions have non-symmetrical cross-sections, in accordance with one embodiment of my invention.
Figure 2:
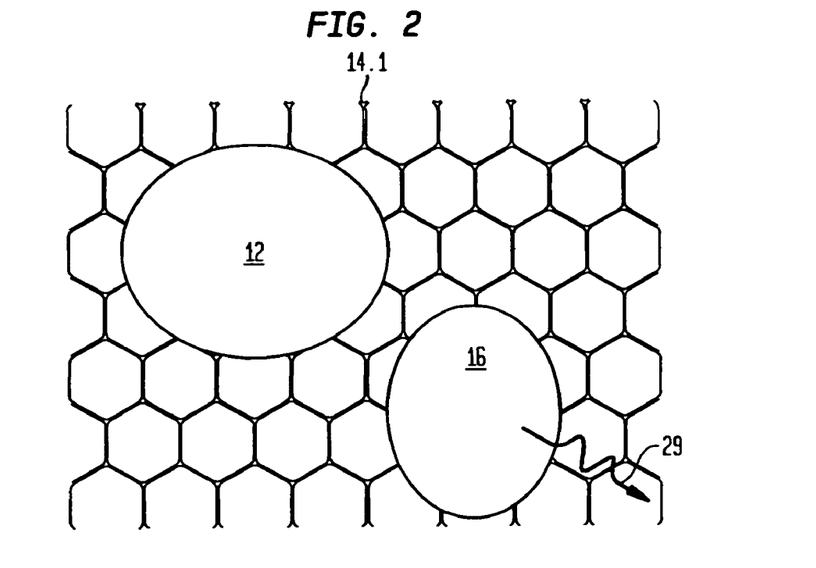
FIG. 2 is a schematic, cross-sectional view of a portion of a fiber of the type shown in FIG. 1 in which the inner cladding region comprises a hexagonal lattice (bandgap) structure.

With reference now to FIGS. 1-2, a polarization-dependent optical fiber 10 in accordance with one aspect of my invention comprises a core region 12 surrounded by an annular cladding region 14, with the core and cladding regions configured to support and guide the propagation of signal light (optical radiation) axially along a longitudinal z-axis 19 located at essentially the center of the core region 12. (Although signal light may actually crisscross axis 19 as it propagates along fiber 10, it is well understood in the art that the general direction of propagation is fairly stated as being along axis 19.) Cladding region 14 includes an inner cladding region 14.1 that surrounds core region 12 and an outer cladding region 14.2 that surrounds inner cladding region 14.1. The latter further includes a localized waveguide region 16 in which light propagates essentially parallel to axis 19. [Even in designs where the waveguide region axially twists (e.g., helically) around the core region, the direction of light propagation therein is considered to be parallel to axis 19 in a very general sense since it does not intersect axis 19.] Like the core region 12, the waveguide region 16 is localized radially and azimuthally in the transverse cross-section of the fiber.

Preferably, the core region 12 and the waveguide region 16 are hollow-core regions; that is, they are not filled with a solid material; rather they are evacuated, or they are filled with a fluid, usually air. Typically the outer cladding region 14.2 is solid glass (e.g., silica), whereas the inner cladding region 14.1, is preferably a bandgap structure; e.g., hexagonal glass lattice structure 14.1, as shown in FIG. 2. (The regions within the hexagonal lattice are also evacuated or filled with a fluid, usually air.) Alternatively, the inner cladding region may be a non-bandgap structure providing hollow-core guidance, such a well-known low-density-of-states structure. Or, the inner cladding region may include a well-known structure approximating a concentric-ring "Bragg fiber" structure around either the core or waveguide region.

In accordance with one aspect of my invention, at least one of the core region 12 and waveguide region 16 is configured so that the first and second polarization states have different effective indices. For simplicity, we refer to the first polarization state as $E_x$ and the second as $E_y$. This design feature may also cause the orthogonal polarizations $E_x$ and $E_y$ to have mode energy distributed asymmetrically; that is, more energy is concentrated along a first transverse axis (e.g., the x-axis) than along a second orthogonal transverse axis (e.g., the y-axis). Thus, for example, polarizations $E_x^{30}$ and $E_y^+$ (FIG. 3) and $E_x^{40}$ and $E_y^{40}$ (FIG. 4) of the signal modes 30, 40, respectively, have different effective refractive indices 30.x, 30.y and 40.x, 40.y, respectively; that is, the modes 30, 40 each exhibit birefringence. Likewise, polarizations $E_x^{32}$ and $E_y^{32}$ (FIG. 3) and $E_x^{52}$ and $E_y^{52}$ (FIG. 5) of the waveguide modes 32, 52, respectively, have different effective refractive indices 32.$x$, 32.$y$ and 52.$x$, 52.$y$, respectively; that is, the modes 32, 52 also each exhibit birefringence. In contrast, none of the modes of waveguide region 42 (FIG. 4) or core region 50 (FIG. 5) is depicted as being birefringent.

Figure 3:
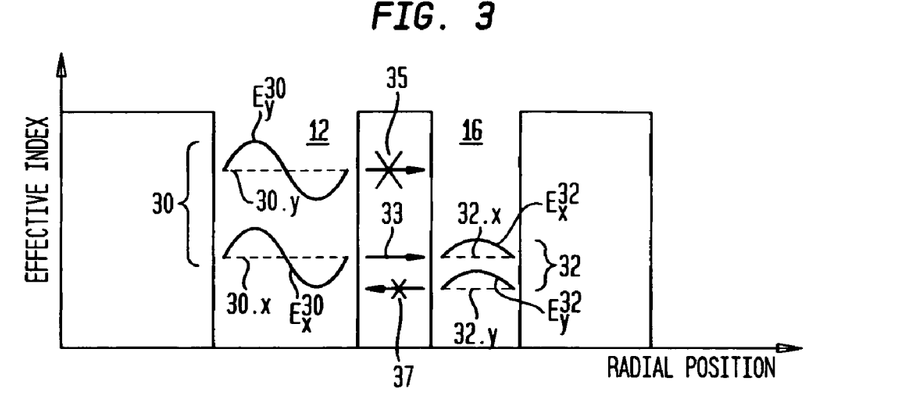
Figure 4:
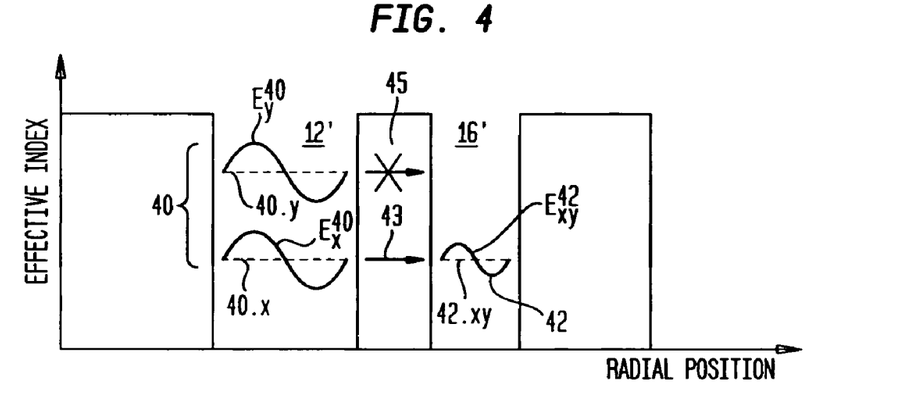
Figure 5:
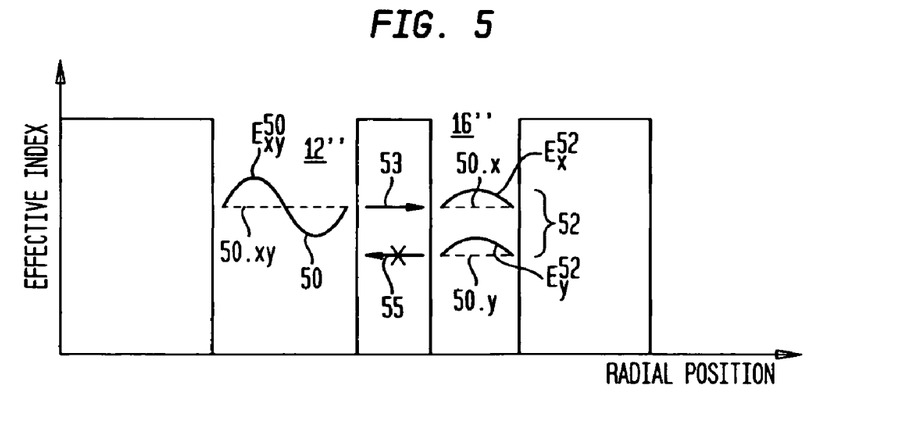

In each design illustrated by FIGS. 3-5, one of the polarizations of a birefringent region is index-matched (i.e., resonantly coupled) to a mode of the other region, which may or may not itself exhibit birefringence. Thus, in FIG. 3 both core region 12 and waveguide region 16 exhibit birefringence, and polarization $E_x^{32}$ of waveguide region 16 is resonantly coupled (arrow 33) to polarization $E_x^{30}$ of core region 12, whereas polarization $E_y^{30}$ of core region 12 and polarization $E_y^{32}$ of waveguide region 16 are not resonantly coupled to any mode (negated arrows 35, 37). On the other hand, in FIG. 4 only core region 12' exhibits birefringence; waveguide region 16' does not. In this case, polarization $E_x^{40}$ of core region 12' is resonantly coupled (arrow 43) to mode 42 ($E_{xy}^{42}$), but polarization $E_y^{42}$ is not resonantly coupled (negated arrow 45) to any mode. Finally, in FIG. 5, mode 50 ($E_{xy}^{50}$) of core region 12" is resonantly coupled (arrow 53) to polarization $E_x^{52}$ of waveguide region 16", but polarization $E_y^{52}$ of waveguide region 16" is not resonantly coupled to any mode (negated arrow 55).

Note, in FIGS. 3-5 the modes 30, 40, 42 and 50 are depicted as being first-order modes, and modes 32 and 52 are depicted as being fundamental modes, for purposes of illustration only. Typically signal modes propagating in the core region are fundamental modes. Oftentimes if higher-order core modes (HOMs) are present, steps are taken to suppress them. Typically, the mode of the waveguide region used for resonant coupling is also a fundamental mode of that region, although other modes may be used.

By the terms resonant or resonantly coupled I mean that the effective index of a mode in the core region is essentially equal to that of a mode in the waveguide region. The condition that a core mode and a waveguide mode have essentially equal effective indices means, for example, that the effective index 30.$x$ (FIG. 3) of core mode $E_x^{30}$ and the effective index 32.$x$ of waveguide mode $E_x^{32}$ are not so different that coupling of light between these modes is significantly frustrated. In a preferred embodiment of my invention, the difference between indices 30.$x$ and 32.$x$ is much less than the difference between the core mode index 30.$y$ and the waveguide mode index 32.$y$. In another embodiment of my invention, the difference between indices 30.$x$ and 32.$x$ is also much less than the difference between the core mode index 30.$y$ and the waveguide mode index 32.$x$.

In order to achieve the desired polarization dependence in my optical fiber, the core or waveguide region, or both, is/are uniquely designed to achieve the aforementioned birefringence. These designs preferably exploit geometrical birefringence; that is, the designs involve either the shape of the core and/or waveguides regions or the presence of micro-defects at or near periphery of the regions. Alternatively, or in addition, these designs may exploit material birefringence; that is, the designs may involve filling the hollow core and/or waveguide regions with a birefringent fluid.

More specifically, in one embodiment, at least one of the core region and waveguide region has an asymmetric cross-sectional shape (e.g., oblong) with respect to one of the transverse axes. In an alternative embodiment, both regions are asymmetric but with respect to orthogonal axes. FIGS. 1-2 depict a core region 12 that is illustratively oblong and approximately oriented along the x-axis and a waveguide region 16 that is also oblong but approximately oriented along the (orthogonal) y-axis. Other asymmetric shapes are suitable, and the two regions may have the same or different shapes. In either case, the regions 12 and 16 are preferably hollow regions fabricated within a glass lattice, which forms inner cladding 14.1. This type of lattice is typically fabricated a by well-known stack-and-draw technique, and the hollow core/waveguide regions may be formed by omitting a suitable number of the stacked tubes/capillaries from the designated core/waveguide region. Alternative fabrication techniques include well-known sol-gel casting or extrusion.

Figure 6A:
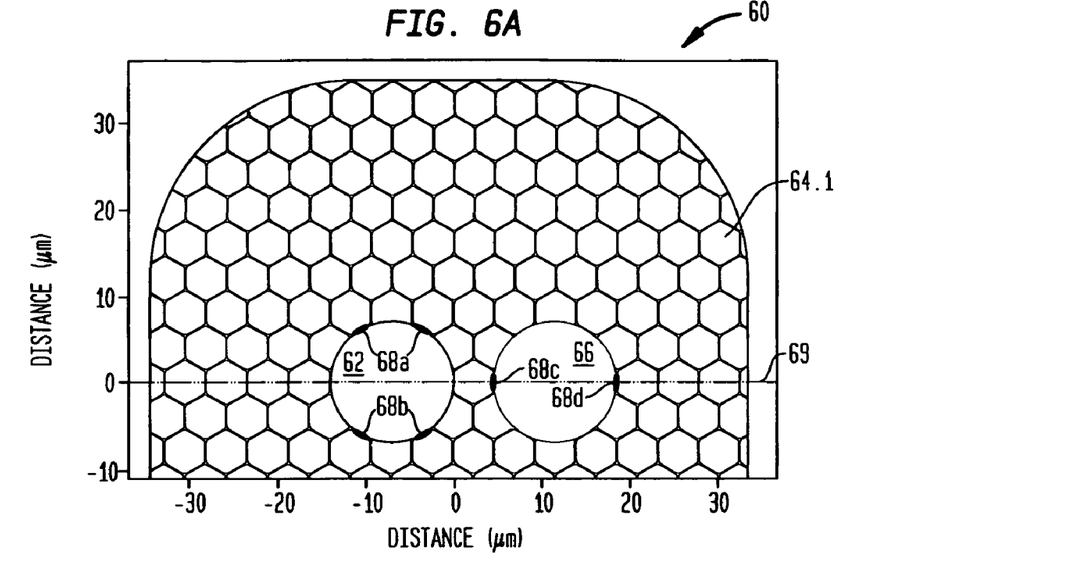
FIG. 6A is a schematic, cross-sectional view of a portion of a bandgap fiber used in simulation studies, in accordance with one embodiment of my invention. In order to produce birefringence, micro-defects were included at or near the periphery of both the core and waveguide regions.

In another embodiment, as shown in FIG. 6A, at least one of the core region 62 and waveguide region 66 includes a multiplicity of micro-defects 68 disposed at or near the periphery of the region and in a non-rotationally-symmetric pattern. In an alternative embodiment, both the core region 62 and the waveguide region 66 include a multiplicity of micro-defects 68 disposed at or near the periphery of each of the regions and in a non-rotationally-symmetric pattern, but the asymmetry of the two patterns relative to one another resides with respect to orthogonal axes. To illustrate the concept, two micro-defects 68$a$ are positioned near the top and two 68$b$ near the bottom of the circumference of essentially circular core region 62, thereby concentrating core mode energy along the x-axis. However, only one micro-defect 68$c$ is positioned at the left and one 68$d$ at the right on the circumference of essentially circular waveguide region 66, thereby concentrating waveguide mode energy along the y-axis. Micro-defects are illustratively elliptical glass features of the type described by P. J. Roberts, et al., *Optics Express*, Vol. 14, No. 16, pp. 7329-7341 (2006), which is incorporated herein by reference.

With respect to rotational symmetry, it is well known that 2-fold rotationally symmetric geometries tend to be birefringent, whereas N-fold rotationally symmetric geometries tend to be non-birefringent if N>2. Therefore, when I use the terms non-rotationally symmetric, I exclude 2-fold rotations (rotations by π).

The implicit assumption of the foregoing discussion is that the desired index-matching of core modes to waveguide modes is achieved by the a priori design and, therefore, resonant coupling is inherent in the as-fabricated fiber. Where, however, manufacturing tolerances, for example, render resonance difficult to achieve, the desired index-matching can be achieved by bend (or twist) tuning. That is, bending or twisting the fibers 10 or 60 alters the effective-refractive index of the modes, thereby providing a post-fabrication technique for tuning mis-matched modes in the as-fabricated straight fiber so that they become matched in the bent/twisted fiber. The concept is illustrated in the effective index profiles of FIGS. 7-8. No modes are resonantly coupled in FIG. 7, as indicated by the negated arrows 73, 75; that is, effective index 72.$x$ of polarization $E_x$ of the core region 72 is not matched to the effective index 76.$x$ of polarization $E_x$ of the waveguide region 76, and, likewise, effective index 72.$y$ of polarization $E_y$ of the core region 72 is not matched to the effective index 76.$y$ of polarization $E_y$ of the waveguide region 76. [Note, even though effective index 72.$x$ appears to be matched to effective index 76.$y$, and likewise effective index 72.$y$ appears to be matched to effective index 76.$x$, well-known symmetry rules may prevent these orthogonal modes ($E_x$ and $E_y$) from being resonantly coupled (i.e., their overlap integrals may be zero).] In contrast, when the fiber is bent/twisted, the effective index profile 77 of the straight fiber is shifted to profile 87 in the bent/twisted fiber, as shown in FIG. 8. This profile shift alters the positions of the effective mode indices of both the core region 82 and the waveguide region 86. When these indices are changed by an appropriate amount readily calculated by those skilled in the art, effective index 82.$x$ of polarization $E_x$ of core region 82 is now resonantly coupled to effective index 86.$x$ of polarization $E_x$ of waveguide region 86, as indicated by arrow 83; that is, effective index 82.$x$ is essentially equal to effective index 86.$x$. However, the polarizations $E_y$ of the core and waveguide regions are still not resonantly coupled to one another, as indicated by the negated arrow 85.

The bend-induced shift $\Delta n_{bend}$ of refractive index at a transverse position (x,y) is given by Equation (1), for a bend of radius $R_{bend}$ and orientation $\theta_{bend}$:

$$\Delta n_{bend}(x,y) \sim n(x,y)[x\cos(\theta_{bend}) + y\sin(\theta_{bend})]/R_{bend} \quad (1)$$

where n(x,y) is the material refractive index of the fiber. Similarly, the effective index shift for a mode centered at $(x_m, y_m)$ is given by Equation (2):

$$\Delta n_{bend}(x_m, y_m) \sim n(x_m, y_m)[x_m \cos(\theta_{bend}) + y_m \sin(\theta_{bend})]/R_{bend} \quad (2)$$

The bend-induced tuning or shift in index-matching between waveguide and core modes is then approximately $$\Delta n = \Delta n_{bend}(x_{wg}, y_{wg}) - \Delta n_{bend}(x_{core}, y_{core}) \quad (3)$$

where $(x_{wg}, y_{wg})$ and $(x_{core}, y_{core})$ correspond to the positions (x,y) in the waveguide region and core region, respectively. For example, if the bend orientation is $\theta_{bend} = 0$, the material index inside the core and waveguide is $n_0$, and the core and waveguide regions are centered at $x_{core}$ and $x_{wg}$, respectively, the effective index differences between the core and waveguide modes will be shifted by approximately $\Delta n$ given in Equation (4):

$$\Delta n \sim n_0 [x_{wg} - x_{core}]/R_{bend} \quad (4)$$

Thus, if $x_{wg} - x_{core} \sim 20$ µm and $R_{bend} \sim 3$ cm, then $\Delta n_{bend} \sim 0.001$ can be achieved for an evacuated core, $n_0 = 1$. This simplified analysis, however, assumes the orientation of the index profile with respect to the bend remains relatively constant for some relevant fiber length.

Figure 7:
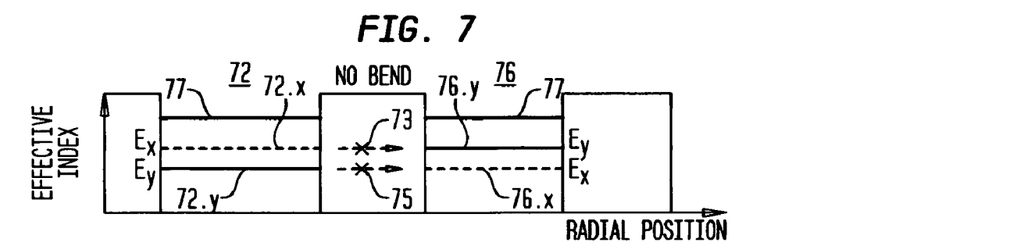
FIGS. 7 & 8 are schematic, effective index profiles of the core and waveguide regions used to describe resonant polarization-dependent coupling (or lack thereof) between core and waveguide modes of a straight fiber (FIG. 7) and a bent fiber (FIG. 8), in accordance with yet another embodiment of my invention.
Figure 8:
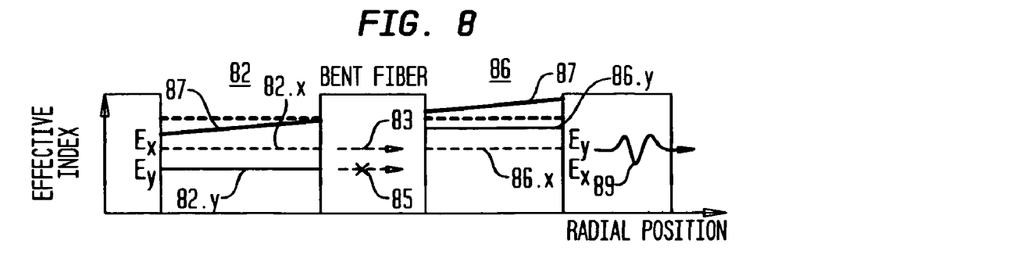

It is apparent from FIGS. 7-8 that this design achieves polarization-dependent coupling; that is, the $E_x$ polarization is coupled from the core region to the waveguide region, but the $E_y$ polarization is not.

Figure 6B:
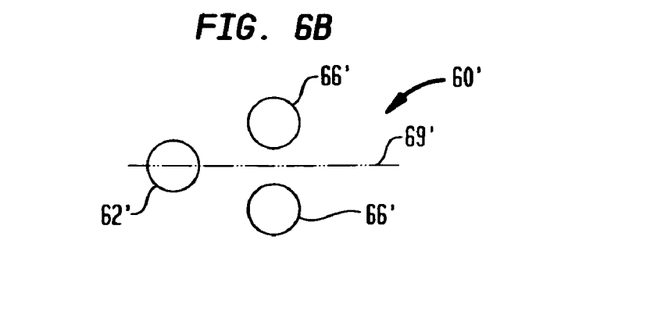
FIG. 6B is a schematic view of the placement of a core and two waveguide regions configured to exhibit reflection symmetry, in accordance with another embodiment of my invention.

A preferred design may further orient the birefringent axis of the individual core and waveguide regions to be either coincident with, parallel to, or orthogonal to the axis passing through the center of these two regions. Thus, the birefringent axis in FIG. 6A is coincident with axis 69, which passes through the centers of core region 62 and waveguide region 66. Similarly, it may be preferable to configure the fiber to have an axis of reflection symmetry passing through at least the core region. Thus, fiber 60' of FIG. 6B has an axis 69' of reflection symmetry passing through the center of the core region and half-way between upper and lower waveguide regions 66'. Such an axis defines two groups of modes with different symmetries with essentially no coupling. For example, a core mode of one symmetry group has essentially zero overlap with a waveguide mode of a different symmetry group.

Design Considerations & Simulation Results

The following discussion describes computer simulations of various optical fiber designs incorporating the inventive principles of my invention for polarization-dependent coupling. Although silica fibers are assumed for purposes of the simulations, the particular materials, dimensions and operating conditions are provided by way of illustration only and, unless otherwise expressly stated, are not intended to limit the scope of the invention.

The design of bandgap fiber 60 of FIG. 6A was simulated using the dimensions described below. More specifically, the hollow core region 62 and hollow waveguide region 66, which were embedded in a hexagonal inner cladding lattice 64.1, were roughly circular having diameters of approximately 13.5 µm and a center-to-center spacing ~18 µm. The lattice had nearest-neighbor, hexagonal hole spacing (pitch) $\Lambda = 4.6$ µm, with rounded-corner hexagonal hole shapes. The hole radius was $r_0 = 0.98$ ($\Lambda/2$) at its minimum (along the hexagonal flat portion of the hole), and the minimum radius of curvature (at the rounded corners of the hexagons) was $r_1 = 0.45 r_0$. Around the circumference of core region 62 web thickness of 0.07 µm was 0.75 times the lattice-web thickness. The core region included four micro-defects 68a, 68b, whereas the waveguide region 66 had only two defects 68c, 68d. In both cases the micro-defects were positioned so that they did not form a rotationally symmetric pattern (except for rotation by $\pi$, or a two-fold rotation) and thus induced birefringence. Each micro-defect was roughly an elliptical feature having a major axis length of ~1.8 µm and a minor axis length of ~0.6 µm.

Figure 9:
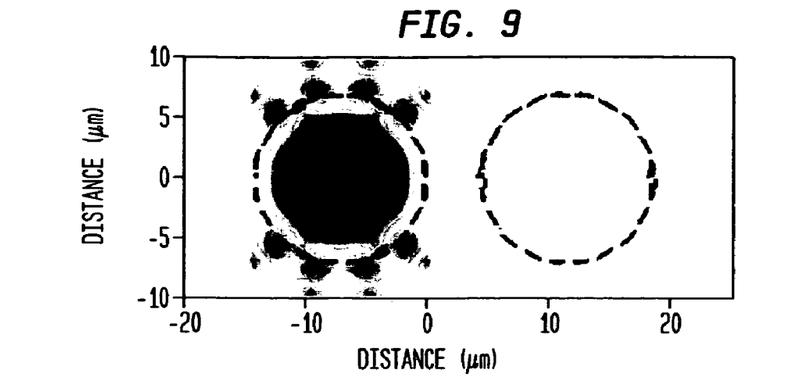
FIGS. 9 & 10 are calculated intensity images of $E_y$-polarized modes in the core region (FIG. 9) and in the waveguide region (FIG. 10) of the fiber of FIG. 6A.
Figure 10:
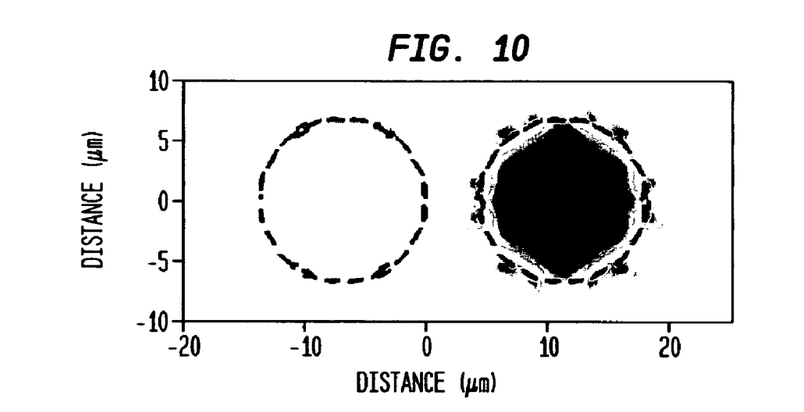

Calculated intensity images for eigenmodes of the fiber of FIG. 6A are shown in FIGS. 9-10, assuming $R_{bend} = 7.5$ cm. These simulations assumed a bent fiber since typical applications involve bending the fiber to satisfy packaging, tuning or other requirements. However, the specific bend radius of 7.5 cm is illustrative only; fibers in accordance with my invention may employ a wide range of radii greater or less than this value.

Figure 11:
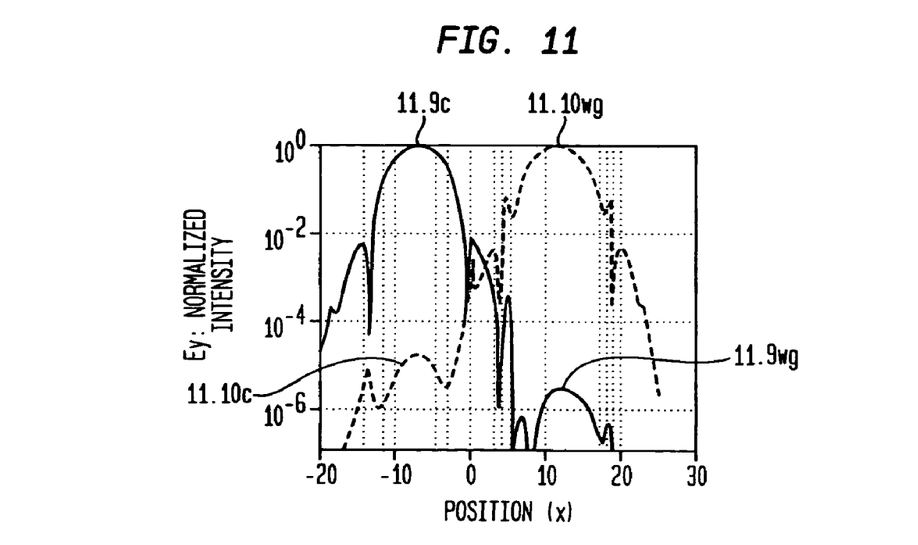
FIG. 11 is a normalized intensity plot corresponding to the $E_y$-polarized modes of FIGS. 9-10.

The images of FIGS. 9-10 demonstrate one fiber design in which $E_y$-polarized modes are well-isolated to either the core region (left) or the waveguide region (right). This implies that if an $E_y$-polarized mode is launched into the core region (FIG. 9, left), essentially none of that mode is coupled from the core region to the waveguide region (right). The lack of such coupling is confirmed by the intensity plots (FIG. 11), which indicate that the normalized intensity of the $E_y$ polarization is 1.0 (point 11.9c) at or near the center of the core region but is only about $10^{-5}$ (point 11.9wg) or less at or near the center of the waveguide region. Similarly, if the polarization $E_y$ is launched into the waveguide region (FIG. 10, right), essentially none of that mode is coupled from the waveguide region (right) to the core region (left). The lack of such coupling is again confirmed by the intensity plots (FIG. 11), which indicate that the normalized intensity of the $E_y$ polarization is 1.0 (point 11.10wg) at or near the center of the waveguide region but is only about $10^{-5}$ (point 11.10c) or less at or near the center of the core region.

Figure 12:
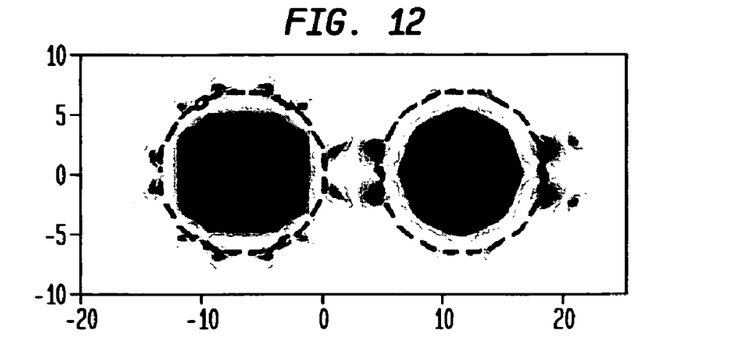
FIGS. 12 & 13 are calculated intensity images of $E_x$-polarized modes in the core region (FIG. 12) and in the waveguide region (FIG. 13) of the fiber of FIG. 6A.
Figure 13:
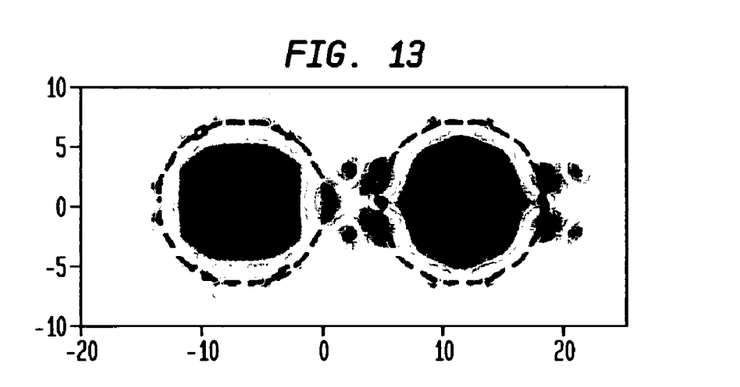
Figure 14:
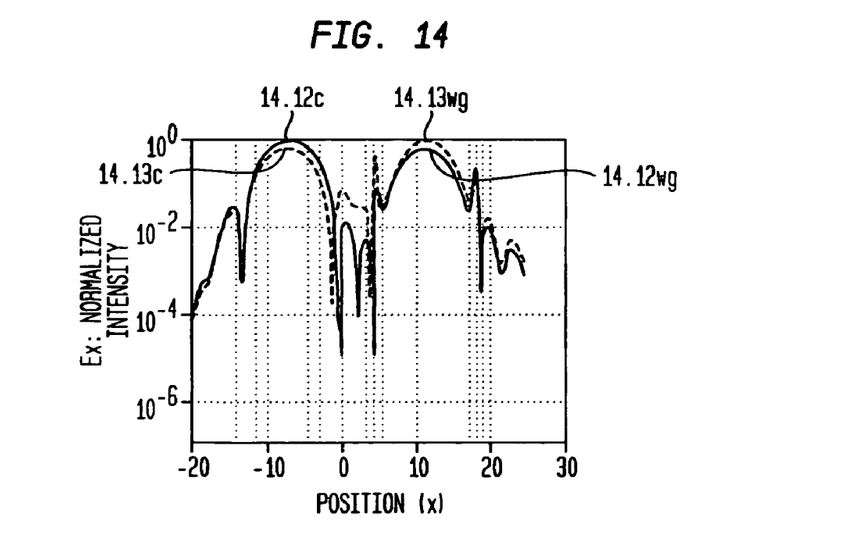
FIG. 14 is a normalized intensity plot corresponding to the $E_y$-polarized modes of FIGS. 12-13.

In contrast, the calculated intensity images of FIGS. 12-13 demonstrate that the same fiber design had very different coupling behavior for the Ex-polarization state. The $E_x$-polarized modes were mixed containing both core modes and waveguide modes. This mixing was a clear indication of efficient energy exchange between the core and waveguide regions: $E_x$-polarized light launched into the core region, for example, had roughly equal components of the two mixed-modes, and most of the launched energy exchanged between the core and waveguide regions. The beating of the two mixed modes was then manifested as an oscillation of energy between the core and waveguide. The total amount of coupled energy would depend on the length of the coupler, as is well known in the art. For example, one can couple launched core light at the input of a fiber to waveguide light at the output of the fiber by choosing the fiber length to be an odd multiple of half the oscillation period. The roughly even split of energy was confirmed by the intensity plots (FIG. 14), which indicated that the normalized intensity of the $E_x$ polarization was 1.0 (point 14.12*c*) at or near the center of the core region and was about 0.6 (point 14.12*wg*) at or near the center of the waveguide region (and conversely for points 14.13*c* and 14.13*wg*). Other designs may achieve a still more even split of energy between the two regions for the mixed modes, allowing an even larger fraction of the total energy to be coupled to the waveguide mode at the output.

The $E_y$ polarization (FIGS. 9-11) and the Ex polarization (FIGS. 12-14) had very different properties, which demonstrated the desired polarization-dependent characteristics of the fiber of FIG. 6A.

Figure 15:
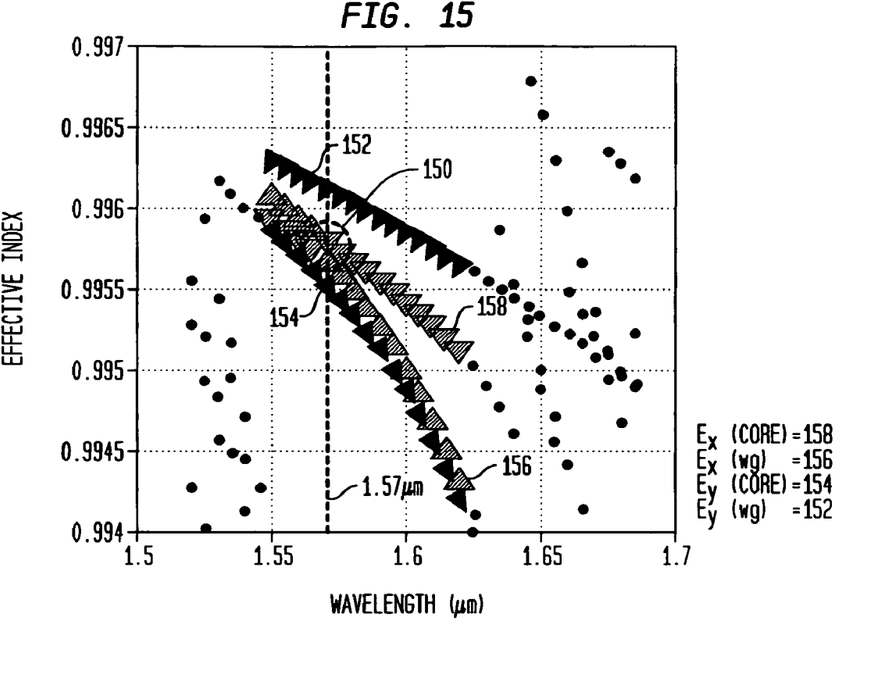
FIG. 15 is a graph of effective index versus signal wavelength for the fiber of FIG. 6A showing a region of index matching for one polarization ($E_x$) and a region of index mismatch for the orthogonal polarization ($E_y$)
Figure 16:
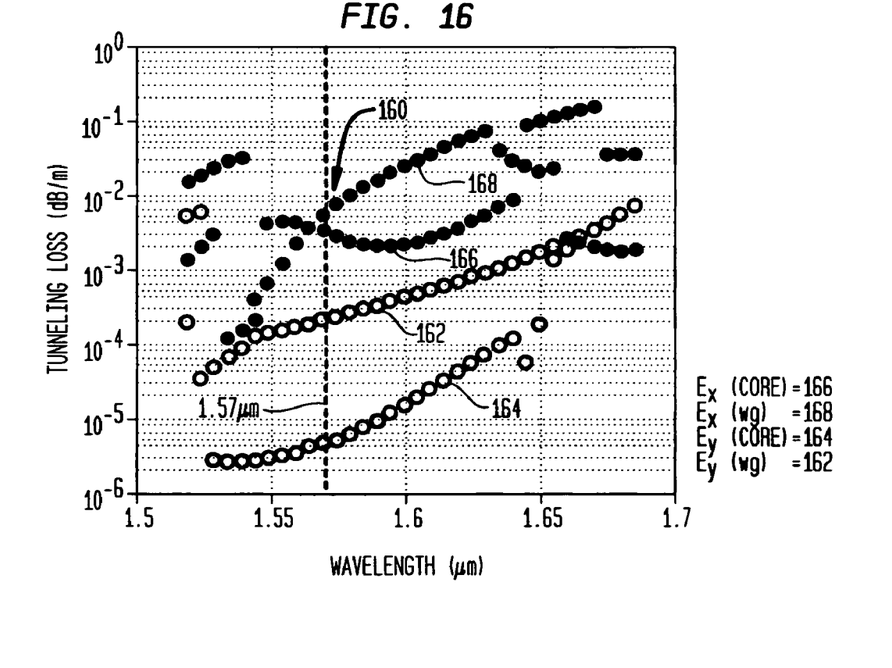
FIG. 16 is a graph of tunneling loss versus signal wavelength for the fiber of FIG. 6A showing a relatively large polarization-dependent loss for the $E_x$ polarization.

The effective index and tunneling loss of the fiber of FIG. 6A are shown in FIGS. 15-16, respectively. Thus, FIG. 15 shows effective index plots for polarization $E_x$ (curves 158, 156 for the core and waveguide regions, respectively) and for polarization $E_y$ (curves 154, 152 for the core and waveguide regions, respectively). The two mode index curves 154, 152 for the $E_y$ polarizations of the core and waveguide regions, respectively, are widely separated, which means that the two modes were not resonantly coupled at any signal wavelength. In contrast, the two mode index curves 158, 156 for the $E_x$ polarizations are nearly index-matched in zone 150 at a signal wavelength around 1570 nm.

On the other hand, FIG. 16 shows optical tunneling loss plots for polarization $E_x$ (curves 166, 168 for the core and waveguide regions, respectively) and for polarization $E_y$ (curves 164, 162 for the core and waveguide regions, respectively). The tunneling loss for all four modes near a signal wavelength of about 1570 nm was low, below 10 dB/km. This level of tunneling loss may be smaller than (or comparable to) other losses (e.g., scattering), and so can be considered negligible. However, the calculation shows the potential for highly selective polarization-dependent loss. The $E_x$-polarization in the core region (curve 166) had a tunneling loss ~1000 times greater than the tunneling loss of the $E_y$ polarization in the core region (curve 164). This confirms that my general strategy is useful for designing a low loss coupler and may be useful for designing a polarizer.

Applications

As described above, a transverse signal mode actually consists of two signal modes with orthogonal polarizations ($E_x$ and $E_y$). These signal modes can be made to couple very differently to waveguide (cladding) modes, and this polarization-dependent coupling can be used to make a variety of devices.

Figure 17:
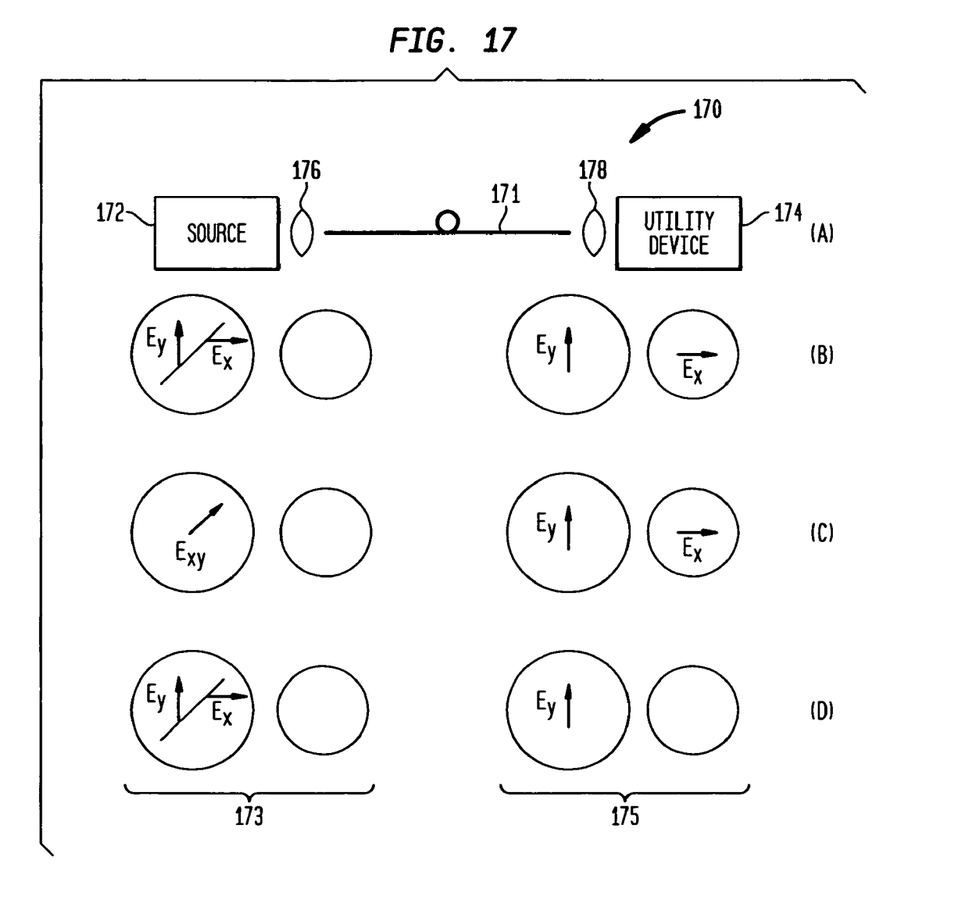

Various applications of my invention are illustrated by the block diagrammatic apparatus, system of FIG. 17A, which depicts an optical fiber 171 in accordance with various embodiments of my invention, a signal source 172 coupled to an input end of fiber 171 by means of a well-known lens or lens system 176 and a utilization device 177 coupled to an output end of fiber 171 by means of another well-known lens or lens system 178. The modes of the core and waveguide regions at input end 173 and the output end 175 are shown in FIGS. 17B, 17C and 17D. Depending on the particular application, either the core region, or the waveguide region, or both, may be designed to be birefringent using the techniques previously described.

Thus, FIG. 17B illustrates a polarization splitter in which the signal is characterized by polarizations $E_x$ and $E_y$ in a birefringent core region; hence the two polarizations in the core region are shown not phase-matched relative to one another. As a result of suitable resonant coupling, at the output end $E_x$ is coupled to the waveguide region, but $E_y$ remains in the core region. This functionality follows that of FIG. 3, as well as that of FIGS. 6A and 7-16.

FIG. 17C illustrates a similar splitter except that the core region is not birefringent, but the waveguide region is. In this case the $E_x$ and $E_y$ polarizations are coincident (not phase-matched to one another) at the input end and, therefore, are shown as single vector $E_{xy}$. As in FIG. 17B, as a result of suitable resonant coupling, at the output end $E_x$ is coupled to the waveguide region, but $E_y$ remains in the core region. This functionality follows that of FIG. 5.

Finally, FIG. 17D illustrates a polarizer in which the core region is birefringent, similar to the design of FIG. 17B. A signal mode is polarized in both the $E_x$ and $E_y$ directions in the core region at the input end, as indicated by the out-of-phase vectors $E_x$ and $E_y$, but only the $E_y$ polarization is coupled into the waveguide region at the output end. The $E_x$ polarization is suppressed by means well known in the art but not shown. For example, the $E_x$ polarization at the output end may be suppressed via leaky cladding modes, which are usually present. Alternatively, this energy may be lost due to absorption, scattering, etc. This type of suppression is depicted schematically by the (optional) wavy arrows 29 of FIG. 2 and 89 of FIG. 8

In each the foregoing embodiments resonant coupling between the core region and the waveguide region is, in a practical sense, not perfect. Thus, even when no coupling is intended an insignificantly small amount of mode energy may still be coupled into the waveguide region (e.g., point 11.9*wg*, FIG. 11). On the other hand, less than 100% resonant coupling may also be an intended design feature of certain couplers. For example, above we discussed an embodiment where mode energy for one polarization ($E_x$) is split approximately evenly between the core and waveguide regions, and where the length of the coupling region is an odd multiple of the oscillation period. This design was sufficient to achieve coupling of most of the $E_x$ polarized energy to the waveguide, while maintaining nearly all of the $E_y$ polarization in the core. However, specific coupling functions may be achieved by adjusting the length of the coupler fiber, or by adjusting the mixed-modes. The ratio of energy in the core and waveguide of the two mixed-modes are readily adjusted by controlling two design features: the degree of index-matching between the core and waveguide regions for each polarization; and the standard overlap integrals of the modes. To exploit this aspect of my invention the core and waveguide regions are configured so that (i) at least one of the core mode and the waveguide mode is birefringent, (ii) a first core mode polarization state is resonantly coupled at a first coupling level to a waveguide mode; and (iii) the core mode second polarization state is resonantly coupled at a second, different coupling level to the waveguide mode.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention.

In addition, in well-known sensor applications the hollow-core region of my optical fibers would typically be filled with a suitable fluid (liquid or gas). The fluid, for example, may be air containing a species, such as a pollutant, to be detected. A source of light is coupled into the fiber, where it is absorbed by the pollutant. Absorption of light by the pollutant is sensed by the detector as a change in, for example, the intensity of light at a wavelength associated with the pollutant. Fluid in the fiber may be maintained in a static state or a dynamic (flowing) state. In either case, fluid may flow out of the fiber via an exit port.

I claim:

1. An optical fiber comprising:
a hollow core region having a longitudinal axis, said core region configured to support and guide the propagation of signal light in a transverse core mode characterized by either a first polarization state, or a second orthogonal polarization state, or both, said core mode propagating in said core region in essentially the direction of said axis, and
a cladding region including a localized hollow waveguide region configured to support and guide the propagation of light in a transverse waveguide mode, said waveguide mode propagating in said waveguide region in a direction essentially parallel to said axis,
said core and waveguide regions being further configured so that (i) at least one of said core mode and said waveguide mode is birefringent, and (ii) at least one of said core mode polarization states is resonantly coupled to said waveguide mode,
wherein said core region includes a multiplicity of micro-defects disposed at or near the periphery thereof, said core region micro-defects being positioned in a non-rotationally symmetric pattern within the cross-section of said core region so that signal mode energy therein is distributed therein more along a first transverse axis than along a second orthogonal axis, and
wherein said waveguide region includes a multiplicity of micro-defects disposed at or near the periphery thereof, said waveguide region micro-defects being positioned in a non-rotationally symmetric pattern within the cross-section of said waveguide region so that mode energy therein is distributed therein more along said second orthogonal transverse axis than along said first transverse axis.

2. The fiber of claim 1, wherein said cladding region includes an inner cladding region surrounding said core region and an outer cladding region surrounding said inner cladding region, said waveguide region being located within said inner cladding region.

3. The fiber of claim 2, wherein said fiber comprises a bandgap fiber and said inner cladding region comprises a lattice structure.

4. The fiber of claim 1, wherein said fiber includes means for suppressing signal mode energy after it is resonantly coupled into said waveguide region.

5. The fiber of claim 1, wherein said core region and waveguide regions are configured so that one of said polarization states of said core region is resonantly coupled to said waveguide region but the orthogonal polarization state is not.

6. An optical fiber comprising:
a hollow core region having a longitudinal axis, said core region configured to support and guide the propagation of signal light in a transverse core mode characterized by either a first polarization state, a second orthogonal polarization state, or both, said core mode propagating in said core region in essentially the direction of said axis, and
a cladding region including a localized hollow waveguide region configured to support and guide the propagation of light in a transverse waveguide mode, characterized by either a first polarization state, a second orthogonal polarization state, or both, said waveguide mode propagating in said waveguide region in a direction essentially parallel to said axis,
said core and waveguide regions being further configured so that (i) in at least one of said regions, mode energy is distributed therein more along a first transverse axis than along a second orthogonal axis and (ii) said core mode first polarization states is resonantly coupled into said waveguide mode first polarization state,
wherein said core region includes a multiplicity of micro-defects disposed at or near the periphery thereof, said core region micro-defects being positioned in a non-rotationally symmetric pattern within the cross-section of said core region so that signal mode energy therein is distributed therein more along a first transverse axis than along a second orthogonal axis, and wherein said waveguide region includes a multiplicity of micro-defects disposed at or near the periphery thereof, said waveguide region micro-defects being positioned in a non-rotationally symmetric pattern within the cross-section of said waveguide region so that mode energy therein is distributed therein more along said second orthogonal transverse axis than along said first transverse axis,
wherein said cladding region includes an inner cladding region surrounding said core region and an outer cladding region surrounding said inner cladding region, said waveguide region being located within said inner cladding region, and
wherein fiber comprises a bandgap fiber and said inner cladding region comprises a lattice structure.

* * * * *